United States Patent [19]
Welck

[11] 4,037,695
[45] July 26, 1977

[54] INTERLOCK FOR A VEHICLE BRAKE AND CLUTCH CONTROL

[75] Inventor: Arnold Emil Welck, Horicon, Wis.

[73] Assignee: Deere & Company, Moline, Ill.

[21] Appl. No.: 604,166

[22] Filed: Aug. 13, 1975

[51] Int. Cl.² ................................................ F16D 67/02
[52] U.S. Cl. .............................. 192/13 R; 192/114 R; 74/483 R
[58] Field of Search ............... 192/13 R, 114 R, 13 A

[56] References Cited
U.S. PATENT DOCUMENTS

| 2,075,535 | 3/1937 | Miers | 192/13 R |
|---|---|---|---|
| 3,063,528 | 11/1962 | Wood | 192/13 R |

FOREIGN PATENT DOCUMENTS 679,593  1/1930  France .......................... 192/13 R

*Primary Examiner*—Benjamin W. Wyche

[57] ABSTRACT

Provided for controlling the traction drive of a lawn and garden tractor is a vehicle clutch and brake control that includes a hand-operated linkage for selectively shifting a first locking pawl for locking a brake pedal of the control in an engaged parking mode. Connected to the first locking pawl is an interlock member whch is operative to control a second locking pawl for holding the clutch pedal in a position for disengaging the power to the traction drive of the tractor when the first locking pawl is actuated for locking the brake pedal in its engaged parking mode.

8 Claims, 4 Drawing Figures

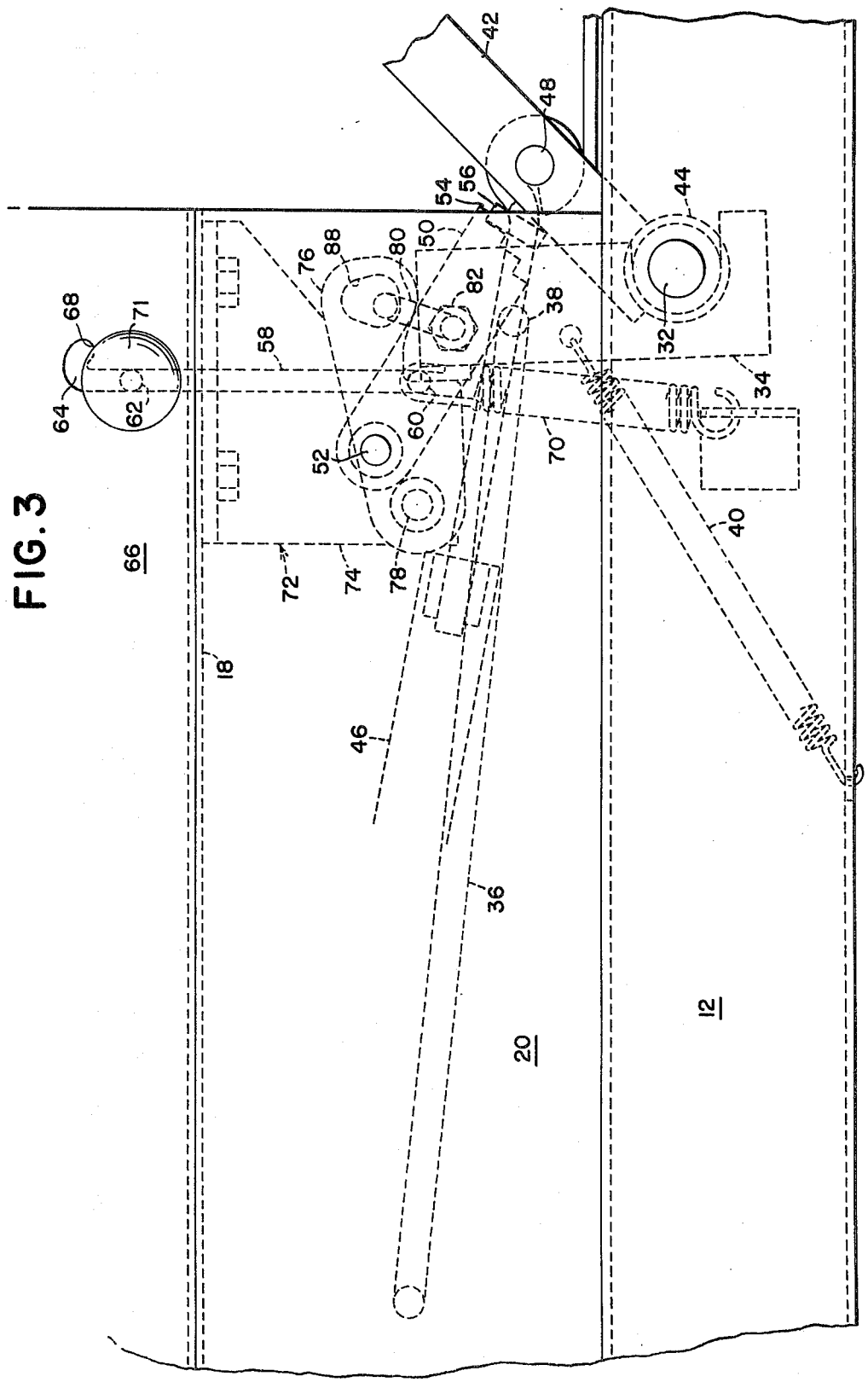

INTERLOCK FOR A VEHICLE BRAKE AND CLUTCH CONTROL

BACKGROUND OF THE INVENTION

The present invention relates to a vehicle brake and clutch control and more particularly relates to such a control wherein the operation of a brake control linkage is interlocked with the operation of a clutch control linkage.

It is common practice to provide a vehicle such as a lawn and garden tractor with a traction drive that is controlled through means of a brake control linkage and a clutch control linkage, the brake control linkage including a brake pedal which is depressible to a brake-engage position to stop the tractor and the clutch pedal being depressible to a power-disengaged position to disconnect power to the traction drive. It is also common practice to include a hand-operated parking brake control linkage for selectively blocking the brake pedal in its brake-engage position.

Such a traction drive control has the disadvantage that the tractor may be operated when the brake pedal is held in its brakeengage position by the parking brake control. Operation of the tractor under this condition may either result in the brake lining being burned out resulting in brake failure or, damage to the drive axle or other drive components could result from releasing the clutch with the engine at full throttle and the transmission in gear.

SUMMARY OF THE INVENTION

According to the present invention, there is provided a novel clutch and brake control for the traction drive of a vehicle.

It is a broad object of the invention to provide a clutch and brake control which is constructed so as to prevent the tractor from being operated when the brake pedal is locked in its parking mode by the parking brake control.

A more specific object of the invention is to provide an interlock means for controlling the operation of the clutch and brake control linkages such that the clutch pedal is prevented from moving to its power-engage position as long as the brake pedal is locked in its brake-engage position by the parking brake control and such that the parking brake control is prevented from locking the brake pedal in its brake-engage position when the clutch is in its power-engage position.

A further object of the invention is to provide a clutch pedal locking pawl which is controlled through means of an interlock member fixed to a brake pedal locking pawl forming part of the parking brake control.

A more specific object of the invention is to provide a clutch pedal locking pawl mounted such that gravity pulls the latter in following engagement with the interlock member.

These and other objects will become apparent from a reading of the following descriptions in conjunction with the appended drawings.

BRIEF DESCRIPTION OF THE DRAWINGS

FIG. 3 is a view similar to FIG. 2 showing the locking pawl of the parking brake engaged with the brake pedal and showing the clutch pedal locking pawl disposed to prevent movement of the clutch pedal from its power-disengage position.

DESCRIPTION OF THE PREFERRED EMBODIMENT

Figure 1:
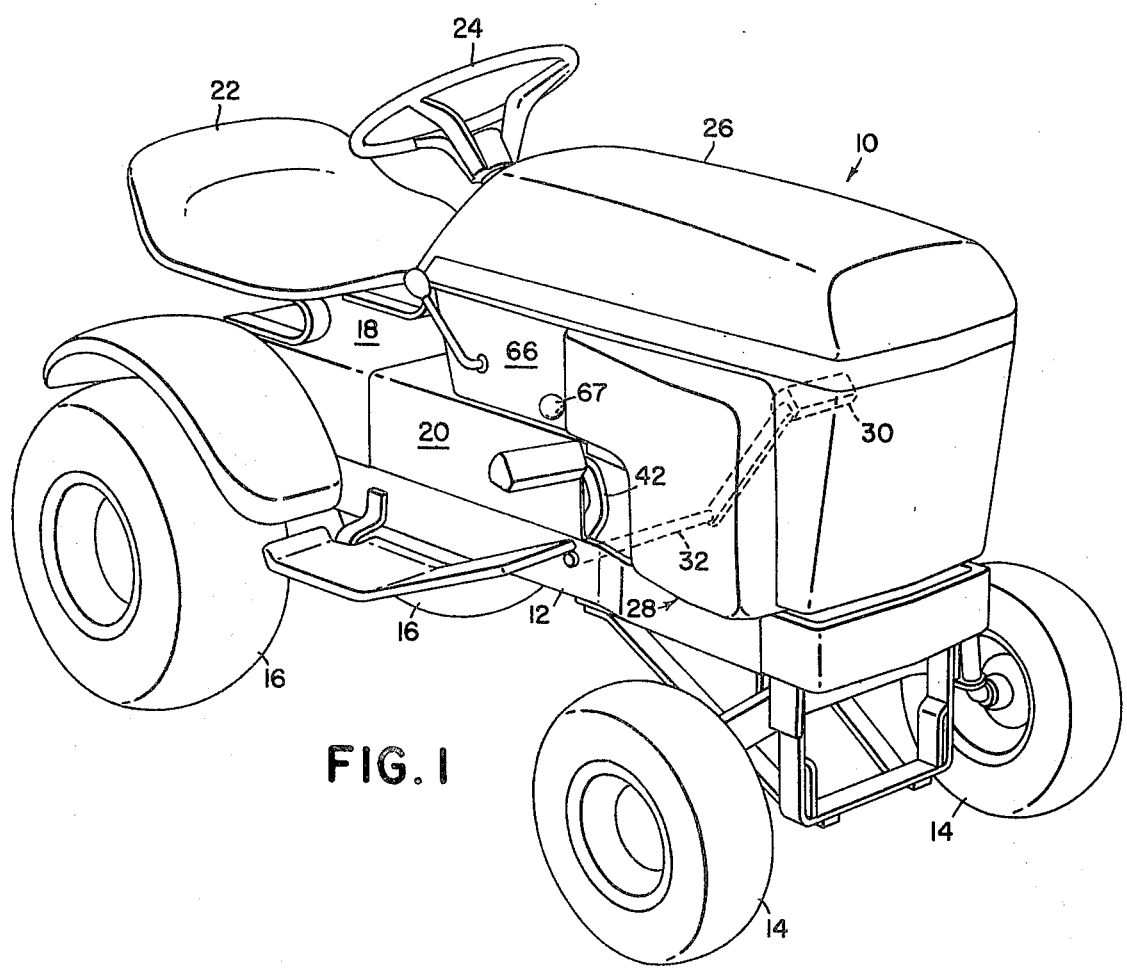
FIG. 1 is a right front perspective view of a lawn and garden tractor with which the present invention is particularly adapted for use.

Referring now to FIG. 1, therein is shown a lawn and garden tractor 10 which is representative of the type of vehicles with which the present invention is particularly adapted for use. The tractor 10 includes a main longitudinal frame 12 supported on a front pair of wheels 14 and a rear pair of traction drive wheels 16. Located between the rear wheels 16 and extending forwardly thereof is a support structure which is inverted U-shaped in transverse cross section and includes a horizontal top wall 18 having vertical side walls depending from its opposite sides, only the right side wall 20 being shown. Mounted on the top wall 18 between the wheels 16 is an operator seat 22 which is located just rearwardly of a steering wheel 24. A hood 26 extends forwardly from a location adjacent the steering wheel 24 and forms a part of an engine enclosure 28 adjacent the forward end of the tractor 10. Located in the engine enclosure 28 is an engine (not shown) which is drivingly connected to the traction wheels 16 through means of a traction drive (not shown) including a main disconnect clutch a brake, and a shiftable multi-speed transmission.

Figure 4:
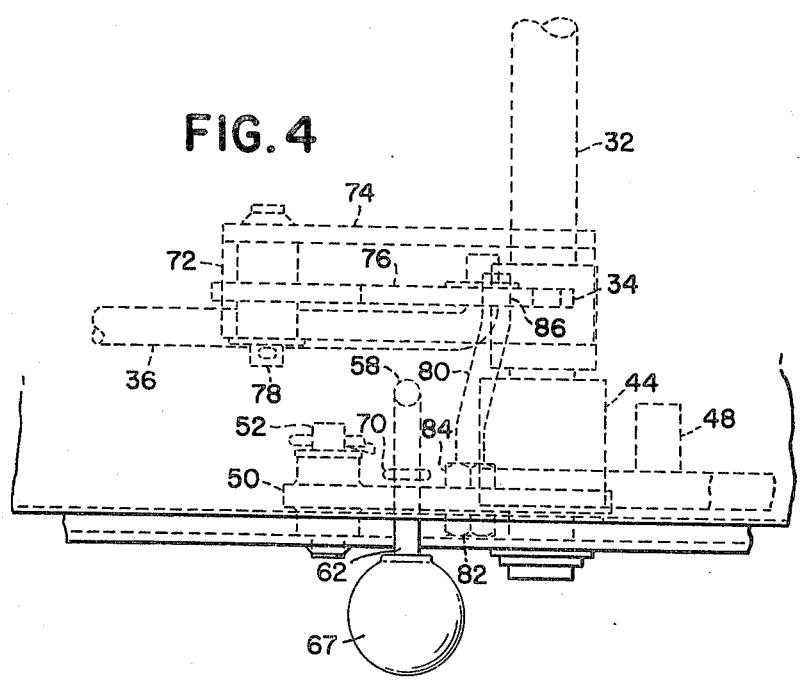
FIG. 4 is a top plan view of the brake and pedal control shown in FIG. 3.
Figure 2:
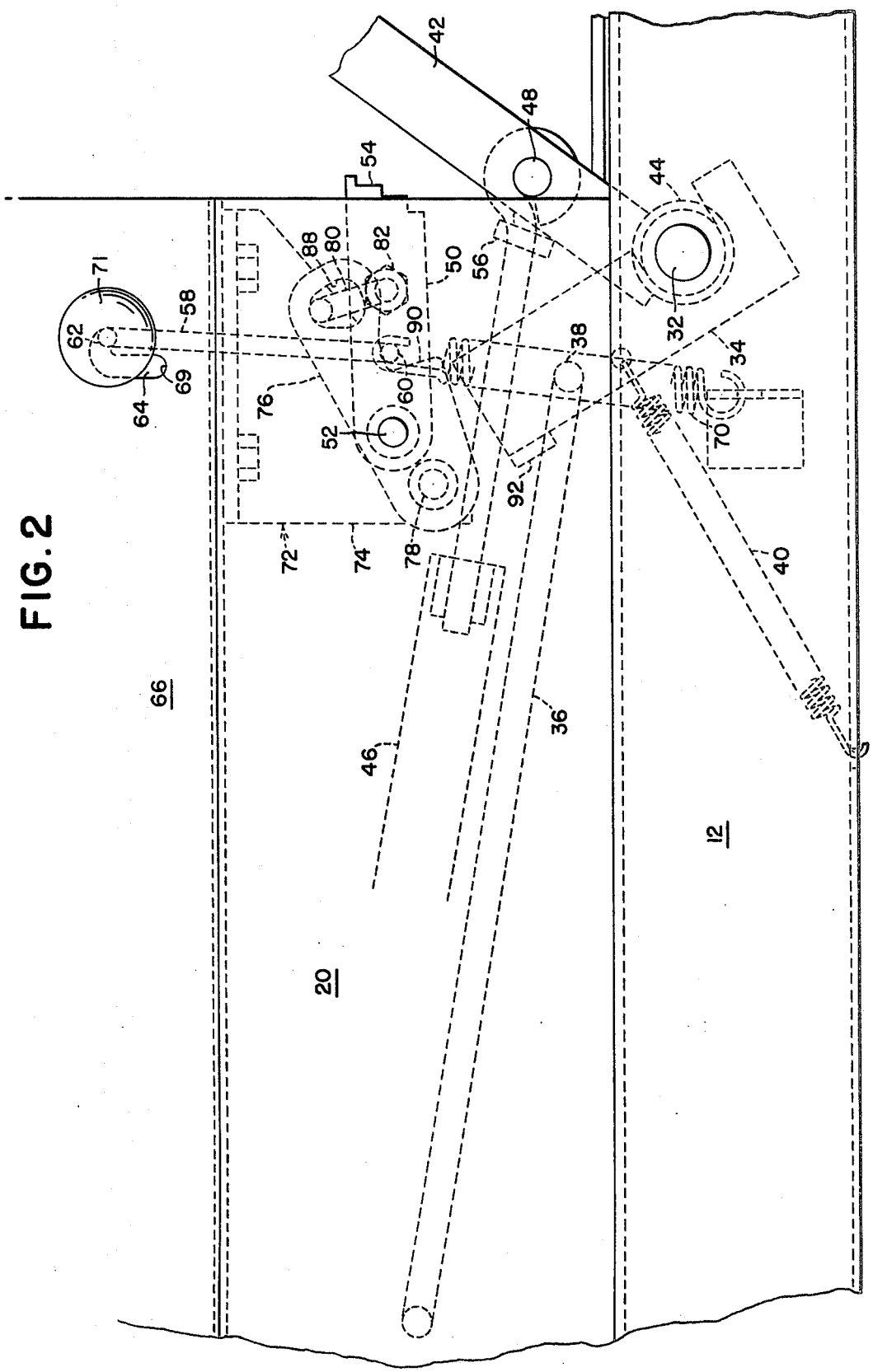
FIG. 2 is a right side elevational view of the brake and clutch control with the brake pedal and clutch pedal locking pawls shown in respective disengaged positions for permitting free operation of the brake and clutch pedals.

Provided for controlling the operation of the main disconnect clutch is a clutch control including a clutch pedal 30 located at the left side of the tractor 10 and having a lower end fixed to a horizontal transverse rod 32 which is rotatably mounted in the tractor frame 12. As can best be seen in FIGS. 2-4, the motion of the clutch pedal 30 is transferred to the clutch through means of a linkage including an upwardly extending arm 34 having a lower end portion fixed to the rod 32 and having a forward end of a fore-and-aft extending motion transmitting rod 36 pivotally connected thereto, as at 38. Connected beteeen the arm 34 and a horizontal flange portion of the frame 12 is a coil tension spring 40 which acts to bias the arm 34 to a normal rearward position, as shown in FIG. 2, wherein the clutch pedal 30 is in a corresponding rearward normal released position effecting a clutch-engage condition in the traction drive.

The brake of the brake and clutch control is controlled through means of a linkage including a brake pedal 42 located at the right side of the tractor 10 and including a hub 44 at its lower end which is rotatably received on a right end portion of the transverse rod 32. Connected to the brake pedal 42 for transferring the motion of the latter to the traction brake is a motion transmitting member 46 having its forward end pivotally connected to the brake pedal 42 as at 48. As is conventional, the traction brake includes release spring means which bias the brake pedal 42 to a normal rearward brake-release position shown in FIG. 2, the pedal 42 being movable forwardly to a brake-engage position shown in FIG. 3.

For the purpose of locking the brake pedal 42 in its brake-engage positon shown in FIG. 3 for establishing a parking mode in the brake control, there is provided a parking brake control including a locking pawl 50 located rearwardly of the brake pedal 42 and having its rearward end vertically, pivotally connected to the side wall 20 at a location above and rearwardly of the transverse rod 32 through means of a horizontal pivot pin 52. The locking pawl 50 is located in fore-and-aft alignment with the brake pedal 42 and includes a forward stepped end 54 disposed for engaging an abutment block 56 fixed to a rear side portion of the brake pedal 42 when the brake pedal is in its brake-engage position shown in FIG. 3 and the locking pawl 50 is in a lower lock position also shown in FIG. 3. Provided for moving the locking pawl 50 between its lower locked position and a raised unlocked position is a control rod 58 having a transversely bent lower end 60 pivotally connected to the locking pawl 50 and having a transversely bent upper portion 62 projecting through a hook-shaped opening 64 provided in a side shield extending between the right side of the hood 26 and the top wall 18 of the support member. The hook-shaped opening 64 is disposed such that it defines upper and lower seats 68 and 69 respectively, for supporting the transverse portion 62 of the control rod 58 in a raised position as shown in FIG. 2, wherein it holds the locking pawl in its raised unlocked position and a lowered position, wherein the locking pawl 50 is in a corresponding lower locked-position as shown in FIG. 3. A spring 70 extends between the transverse portion 60 and the tractor frame 12 for biasing the rod 58 into seated engagement with the seat 68 and a knob 71 is connected to the transverse portion 62 for the operator to grasp in moving the transverse portion between the upper and lower seats 68 and 69 respectively.

For the purpose of preventing the tractor 10 from being operated while the brake pedal 42 is locked in its brake-engaged position by the locking pawl 50, there is provided interlocking means for interlocking the control linkage including the brake pedal 42 with the control linkage including the clutch pedal 30. Specifically, a support bracket 72 including a depending vertical portion 74 is fastened to the underside of the horizontal top wall 18 at a location located above the arm 34. A fore-and-aft extending clutch control locking pawl 76 has its rear end pivotally connected to the depending portion 74 of the bracket 72 through means of a transverse pivot pin 78, the locking pawl 76 being located such that it is in fore-and-aft alignment with the arm 34. A transverse interlock rod 80 has a threaded outer end connected to the brake control locking pawl 50 through means of first and second nuts 82 and 84, respectively, received on the rod 80 so as to be engaged with the inner and outer sides of the pawl 50. The interlock rod has an inner end 86 which extends into an elongate opening or slot 88 provided in the forward end of the pawl 76. The underside of the locking pawl 76 is shaped so as to define a forwardly facing abutment surface 90 disposed, when the brake control locking pawl 50 is in its lower locked position shown in FIG. 3, for engaging an abutment block 92 fixed to an upper surface portion of the arm 34 when the latter is released to move slightly rearwardly from a forward position as shown in FIG. 3 to a position corresponding to a forward clutch-disengage position. As can best be seen in FIG. 2, when the locking pawl 50 is raised to its unlocked position the interlock rod 80 will cause the clutch control 76 to be moved to a raised corresponding unlocked position.

The operation of the brake and clutch control is briefly as follows. Assuming the tractor 10 to be in operation, the brake and clutch control will be in the condition as illustrated in FIG. 2 with the brake control locking pawl 50 held in its raised locked position, through means of the control rod 58, with the brake pedal released to its brake-disengaged position and with the clutch pedal 30 released to its clutch-engaged position. The tractor may then be slowed in the conventional manner by an operator pressing forwardly on the brake pedal 42 or the tractor 10 may be completely stopped by first pushing forwardly on the clutch pedal 30 and then pushing forwardly on the brake pedal 42.

If the operator desires to park the tractor 10, he need only to first press forwardly on the clutch pedal 30 to disengage the clutch, then press forwardly on the brake pedal 42 and then unseat the control rod 58 against the bias of the spring 69 so that the rod 58 may move to the lower seat 69 of the opening 64 so as to effect concurrent movement of the pawl 50 into engagement with the abutment block 56 of the brake pedal 42. It will be appreciated that as the locking pawl 50 lowers the interlock rod 80 will also lower and permit concurrent lowering of the clutch control locking pawl 76, the latter lowering until the surface 90 thereof is positioned for engaging the abutment 92 of the arm 34.

If the operator should attempt to lock the brake pedal 42 while the clutch is engaged, he will not succeed since movement of the control rod 58 to the lower seat 69 will result in the locking pawl 76 coming into contact with the top of the arm 34 with the consequence that the rod 80 will engage the lower portion of the opening 88 before the pawl 50 has moved to its blocking position shown in FIG. 3.

It will be appreciated then that once the clutch is locked in its disengaged position it will not be possible to re-engage power with the transmission unless the brake pedal 42 is first released by raising the control rod 58 back to the upper seat 68 of the opening 64 to disengage the pawl 50 from the brake pedal 42 and to consequently disengage the pawl 76 from the arm 34.

I claim:

1. In a vehicle traction drive clutch and brake control of the type including clutch and brake control linkages exclusive of each other respectively including pivotally mounted clutch and brake pedals with the clutch pedal being pivotable between a normal drive establishing position and an actuated drive disestablishing position and with the brake pedal being pivotable between a normal brake-release position and an actuated brake-engage position, and a parking lock control linkage mounted for selective movement into engagement with the brake control linkage for locking the brake pedal in its actuated position, the improvement comprising: actuating means operatively interconnected between the parking lock control linkage and the clutch control linkage for locking the clutch pedal in its actuated position in response to the parking lock control being moved to lock the brake pedal in its actuated position; said parking lock control linkage including a first pivotally mounted locking pawl movable between a lock position, wherein it engages the brake control linkage and holds the brake pedal in its brake-engage position, and an unlock position wherein it is disposed free of the brake control linkage; and said actuating means includes an interlock member connected to said first locking pawl for movement therewith.

2. The clutch and brake control defined in claim 1 wherein the first locking pawl is vertically pivotally mounted for movement between upper and lower positions respectively corresponding to its unlock and lock positions; said actuating means includes a second vertically pivotally mounted locking pawl disposed for gravitating to a position for engaging said clutch control linkage for retaining the clutch pedal in its drive disestablishing position; and said interlock member being in contact with a surface of said second locking pawl so as to hold the latter in a raised position free of the clutch control linkage when the first pawl is in its unlock position and to permit the second pawl to gravitate to its lower position when the first pawl is moved to its lower position.

3. The clutch and brake control defined in claim 2 wherein the first and second locking pawls are mounted at transversely spaced locations; and said interlock member being in the form of a transverse rod cantilevered from the first locking pawl.

4. In a vehicle traction drive control including clutch and brake control linkages exclusive of each other and respectively including clutch and brake pedals pivotally mounted on a support means for fore-and-aft swinging movement between respective forward clutch-disengaging and brake-engaging positions, and respective normal rearward clutch-engaging and brake-releasing positions, and a parking control linkage including a locking pawl mounted on the support means for movement between a normal unlock position disposed free of the brake control linkage and a lock position engaged with the brake control linkage for preventing movement of the brake pedal from its brake-engage position, the improvemment comprising: interlock means operatively connected between the parking control linkage and the clutch control linkage and responsive to movement of the parking control linkage for moving to a locked position for preventing movement of the clutch pedal from its clutch-disengaging position when the parking control linkage is actuated so as to dispose the pawl in its lock position and the brake pedal is in its brake-engage position.

5. The vehicle traction drive control defined in claim 4 wherein said interlock means includes an interlock member connected to the locking pawl for movement therewith.

6. The vehicle traction drive control defined in claim 5 wherein said interlock means includes a second pawl mounted on the support means for movement between a normal unlock position disposed free of the clutch control linkage and a lock position engaged with the clutch control linkage for preventing movement of the clutch pedal from its clutch-disengage position; and an interlock member operatively interconnected between the first-named pawl and the second pawl for effecting movement of the latter to its lock position, when the first-named pawl is moved to its lock position and to its unlock position, when the first-named pawl is moved to its unlock position.

7. The vehicle traction drive control defined in claim 6 wherein the first-named and second pawls are both pivotally mounted.

8. The vehicle traction drive control defined in claim 6 wherein the first-named and second pawls are arranged in spaced side-by-side relationship and are both vertically pivotally mounted and arranged for gravitating from their respective unlock to their respective lock positions; and said interlock member being cantilevered from the first-named pawl and inserted in an enlarged opening in the second pawl.

* * * * *